United States Patent
Yang et al.

(10) Patent No.: US 10,362,515 B2
(45) Date of Patent: Jul. 23, 2019

(54) INFORMATION OBTAINING METHOD AND APPARATUS BASED ON UNLICENSED CELL

(71) Applicant: HUAWEI TECHNOLOGIES CO., LTD., Shenzhen, Guangdong (CN)

(72) Inventors: Xiaodong Yang, Beijing (CN); Jian Zhang, Beijing (CN); Wei Quan, Beijing (CN); Bingzhao Li, Beijing (CN); Zhenxing Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 156 days.

(21) Appl. No.: 15/360,071

(22) Filed: Nov. 23, 2016

(65) Prior Publication Data

US 2017/0078932 A1 Mar. 16, 2017

Related U.S. Application Data

(63) Continuation of application No. PCT/CN2014/078683, filed on May 28, 2014.

(51) Int. Cl.
*H04W 36/00* (2009.01)
*H04W 36/16* (2009.01)
(Continued)

(52) U.S. Cl.
CPC ....... *H04W 36/0072* (2013.01); *H04W 16/14* (2013.01); *H04W 36/08* (2013.01);
(Continued)

(58) Field of Classification Search
CPC . H04W 36/0072; H04W 36/08; H04W 36/16; H04W 36/32; H04W 16/14; H04W 24/00; H04W 48/16; H04W 72/042
See application file for complete search history.

(56) References Cited

U.S. PATENT DOCUMENTS

| 7,965,675 B2 | 6/2011 | Rahim |
| 8,355,729 B2 | 1/2013 | Li et al. |

(Continued)

FOREIGN PATENT DOCUMENTS

| CN | 101237685 A | 8/2008 |
| CN | 101305624 A | 11/2008 |

(Continued)

OTHER PUBLICATIONS

Notice to Submit a Response, dated Dec. 14, 2017, in Korean Application No. 10-2016-7036139 (8 pp.).
(Continued)

*Primary Examiner* — Asad M Nawaz
*Assistant Examiner* — Saad A. Waqas
(74) *Attorney, Agent, or Firm* — Staas & Halsey LLP (57) ABSTRACT

Embodiments of the present invention relate to the field of communications technologies and disclose an information obtaining method and apparatus based on an unlicensed cell (Uscell). On an unlicensed cell, precision of obtained Uscell information is significantly improved, so as to enable a base station to complete addition and deletion of a Uscell. A specific embodiment of the present invention includes: obtaining detection indication information, where the detection indication information is used to instruct to identify a Uscell and/or instruct to measure a reference signal corresponding to the Uscell, then, performing detection according to the detection indication information, and reporting a detection result to a base station. Technical solutions provided in the present invention are mainly applied to an information obtaining process of the Uscell.

9 Claims, 3 Drawing Sheets

401
User equipment UE obtains detection indication information

402
The UE detects information about a Uscell by using the detection indication information and reports a detection result to a base station (51) Int. Cl.
  *H04W 48/16* (2009.01)
  *H04W 16/14* (2009.01)
  *H04W 36/08* (2009.01)
  *H04W 36/32* (2009.01)
  *H04W 72/04* (2009.01)
  *H04W 24/00* (2009.01)

(52) U.S. Cl.
  CPC ........... *H04W 36/16* (2013.01); *H04W 36/32* (2013.01); *H04W 48/16* (2013.01); *H04W 72/042* (2013.01); *H04W 24/00* (2013.01)

(56) References Cited

U.S. PATENT DOCUMENTS

| | | |
|---|---|---|
| 8,654,707 B2 | 2/2014 | Cook |
| 2011/0228666 A1 | 9/2011 | Barbieri et al. |
| 2012/0039284 A1 | 2/2012 | Barbieri et al. |
| 2013/0016221 A1 | 1/2013 | Charbit et al. |
| 2013/0088983 A1* | 4/2013 | Pragada ............... H04W 16/14 370/252 |
| 2013/0143502 A1 | 6/2013 | Kazmi et al. |
| 2013/0322279 A1 | 12/2013 | Chincholi et al. |
| 2013/0336156 A1 | 12/2013 | Wei et al. |
| 2014/0247743 A1* | 9/2014 | Seo ...................... H04W 24/10 370/252 |

FOREIGN PATENT DOCUMENTS

| | | |
|---|---|---|
| CN | 102457863 A | 5/2012 |
| CN | 102457921 A | 5/2012 |
| CN | 102812772 A | 12/2012 |
| CN | 103069882 A | 4/2013 |
| CN | 103155669 A | 6/2013 |
| EP | 3 099 103 A1 | 11/2016 |
| WO | WO 2008/039124 A1 | 4/2008 |
| WO | WO 2013/055084 A1 | 4/2013 |
| WO | WO2013048200 | 4/2013 |

OTHER PUBLICATIONS

International Search Report dated Mar. 2, 2015 in corresponding International Patent Application No. PCT/CN2014/078683.
International Search Report dated Mar. 2, 2015 in corresponding International Application No. PCT/CN2014/078683.
European Office Action dated Mar. 21, 2018, in corresponding European Patent Application No. 14 893 386.4, 7 pgs.
Chinese Office Action for Chinese Application No. 201480022306.5 dated Dec. 5, 2018.

* cited by examiner

INFORMATION OBTAINING METHOD AND APPARATUS BASED ON UNLICENSED CELL

CROSS-REFERENCE TO RELATED APPLICATIONS

This application is a continuation of International Application No. PCT/CN2014/078683, filed on May 28, 2014, the disclosure of which is hereby incorporated by reference in its entirety.

TECHNICAL FIELD

The present invention relates to the field of communications technologies, and in particular, to an information obtaining method and apparatus based on a Uscell (unlicensed cell).

BACKGROUND

Currently, to effectively use radio frequencies, a spectrum planning method—spectrum management (spectrum management) is established. In the spectrum management, spectrums are divided into two types: licensed spectrums (licensed spectrum) and unlicensed spectrums (unlicensed spectrum). A licensed spectrum refers to a spectrum that is authorized to a mobile operator or a mobile technology to use, and the mobile technology includes a UMTS (Universal Mobile Telecommunications System) technology or an LTE (Long Term Evolution) technology. An unlicensed spectrum refers to a spectrum allocated to an unauthorized user to use, and in such an unlicensed spectrum, different wireless devices can share a spectrum resource. For example, in China, unlicensed spectrums include a spectrum of 2.4 to 2.4835 GHz, a spectrum of 5.725 to 5.850 GHz, and the like. Currently, mobile operators provide communications services for users by using licensed spectrums. However, as requirements of users on mobile broadband increase, the mobile operators cannot satisfy communications requirements of users by merely depending on licensed spectrum resources.

With reference to a current situation, as described above, that the licensed spectrums cannot satisfy requirements of users on communications services, the mobile operators utilize unlicensed spectrums to provide communications services for the users. For example, an operator deploys a 3GPP (the 3rd generation partnership project) network, such as an LTE network, in an unlicensed spectrum, so as to perform cooperative communication with an LTE network of the operator in an existing licensed spectrum. In the licensed spectrum, as a location of UE moves, a base station needs to delete a serving cell scell with unfavorable signal quality and add a scell with favorable signal quality for the UE, so as to enable the scell to provide a communications service for the UE.

During addition or deletion of an scell, the UE needs to correctly obtain information about to-be-measured cells, such as reference signals of the to-be-measured cells, in time, determine reference signal quality of the to-be-measured cells according to the information about the to-be-measured cells, and report the reference signal quality of the to-be-measured cells to the base station, so that the base station can delete a serving cell with unfavorable reference signal quality and add a serving cell with favorable reference signal quality for the UE. However, with regard to a Uscell, the base station cannot continuously provide Uscell information for the UE, so that the UE cannot obtain the Uscell information in time or can only obtain rough Uscell information, and further cannot determine reference signal quality of the Uscell. Consequently, the base station cannot complete addition and deletion of the Uscell. Therefore, the Uscell cannot provide a communications service for the UE and further cannot alleviate a current situation that current mobile operators do not satisfy requirements of users on communications services.

SUMMARY

In an information obtaining method and apparatus based on a Uscell that are provided in embodiments of the present invention, precision of obtained Uscell information is significantly improved on an unlicensed cell, so as to enable a base station to complete addition and deletion of a Uscell, thereby significantly alleviating a current situation that current mobile operators do not satisfy requirements of users on communications services.

To achieve the foregoing objective, the following technical solutions are used in the embodiments of the present invention:

According to a first aspect, an information obtaining apparatus based on a Uscell is provided, where the apparatus includes:

an obtaining unit, configured to obtain detection indication information, where the detection indication information is used to instruct to identify a Uscell, and/or the detection indication information is used to instruct to measure a reference signal corresponding to the Uscell; and the detection indication information is used to instruct to detect information about the Uscell, where the information about the Uscell includes a Uscell identifier or the reference signal corresponding to the Uscell; and a detection unit, configured to detect the information about the Uscell by using the detection indication information obtained by the obtaining unit; and a reporting unit, configured to report a detection result detected by the detection unit to a base station.

In a first possible implementation manner of the first aspect, the obtaining unit includes:

a receiving subunit, configured to receive Uscell configuration information sent by the base station and use the Uscell configuration information as the detection indication information; or the receiving subunit, configured to receive Uscell reference signal auxiliary information sent by the base station and use the Uscell reference signal auxiliary information as the detection indication information; or the receiving subunit, configured to receive reference signal measurement reporting information sent by the base station and use the reference signal measurement reporting information as the detection indication information.

With reference to the first aspect or the first possible implementation manner of the first aspect, in a second possible implementation manner of the first aspect, when the detection indication information obtained by the obtaining unit is used to instruct to measure the reference signal corresponding to the Uscell, the reference signal corresponding to the Uscell includes at least one type of to-be-measured reference signal.

With reference to one or more of the first aspect, the first possible implementation manner of the first aspect, or the second possible implementation manner of the first aspect, in a third possible implementation manner of the first aspect, the detection result indicates a result of identifying the Uscell; or the detection result indicates a measurement result of the reference signal corresponding to the Uscell; or the detection result indicates whether a distance difference from the Uscell satisfies a preset value.

With reference to the first aspect, the first possible implementation manner of the first aspect, the second possible implementation manner of the first aspect, or the third possible implementation manner of the first aspect, in a fourth possible implementation manner of the first aspect, when the detection indication information is the reference signal measurement reporting information, and when the detection result includes a channel quality indicator (CQI) of the Uscell, the detection result indicates an identifier of the Uscell or a pilot to which the CQI belongs and a level of the CQI.

According to a second aspect, an information obtaining apparatus based on a Uscell is provided, where the apparatus includes:

a processor, configured to obtain detection indication information, detect information about a Uscell by using the detection indication information, and report a detection result to a base station, where the detection indication information is used to instruct to identify a Uscell, and/or the detection indication information is used to instruct to measure a reference signal corresponding to the Uscell; and the detection indication information is used to instruct to detect the information about the Uscell, where the information about the Uscell includes a Uscell identifier or the reference signal corresponding to the Uscell; and a memory, configured to store the detection indication information obtained by the processor and the detection result.

In a first possible implementation manner of the second aspect, the apparatus further includes:

a transceiver, configured to receive Uscell configuration information sent by the base station and send the Uscell configuration information received to the processor, where the processor uses the Uscell configuration information as the detection indication information; or the transceiver, configured to receive Uscell reference signal auxiliary information sent by the base station and send the Uscell reference signal auxiliary information received to the processor, where the processor uses the Uscell reference signal auxiliary information as the detection indication information; or the transceiver, configured to receive reference signal measurement reporting information sent by the base station and send the reference signal measurement reporting information received to the processor, where the processor uses the reference signal measurement reporting information as the detection indication information, where the memory is further configured to store the Uscell configuration information, the Uscell reference signal auxiliary information, or the reference signal measurement reporting information that is received by the transceiver.

With reference to the second aspect or the first possible implementation manner of the second aspect, in a second possible implementation manner of the second aspect, when the detection indication information is used to instruct to measure a reference signal corresponding to the Uscell, the reference signal corresponding to the Uscell includes at least one type of to-be-measured reference signal.

With reference to one or more of the second aspect, the first possible implementation manner of the second aspect, or the second possible implementation manner of the second aspect, in a third possible implementation manner of the second aspect, the detection result indicates a result of identifying the Uscell; or the detection result indicates a measurement result of the reference signal corresponding to the Uscell; or the detection result indicates whether a distance difference from the Uscell satisfies a preset value.

With reference to the second aspect, the first possible implementation manner of the second aspect, the second possible implementation manner of the second aspect, or the third possible implementation manner of the second aspect, in a fourth possible implementation manner of the second aspect, when the detection indication information is the reference signal measurement reporting information, and when the detection result includes a channel quality indicator (CQI) of the Uscell, the detection result indicates an identifier of the Uscell or a pilot to which the CQI belongs and a level of the CQI.

According to a third aspect, an information obtaining method based on a Uscell is provided, where the method includes:

obtaining detection indication information, where the detection indication information is used to instruct to identify a Uscell, and/or the detection indication information is used to instruct to measure a reference signal corresponding to the Uscell; and the detection indication information is used to instruct to detect information about the Uscell, where the information about the Uscell includes a Uscell identifier or the reference signal corresponding to the Uscell; and detecting the information about the Uscell by using the detection indication information and reporting a detection result to a base station.

In a first possible implementation manner of the third aspect, the obtaining detection indication information includes:

receiving Uscell configuration information sent by the base station and using the Uscell configuration information as the detection indication information; or receiving Uscell reference signal auxiliary information sent by the base station and using the Uscell reference signal auxiliary information as the detection indication information; or receiving reference signal measurement reporting information sent by the base station and using the reference signal measurement reporting information as the detection indication information.

With reference to the third aspect or the first possible implementation manner of the third aspect, in a second possible implementation manner of the third aspect, when the detection indication information is used to instruct to measure a reference signal corresponding to the Uscell, the reference signal corresponding to the Uscell includes at least one type of to-be-measured reference signal.

With reference to one or more of the third aspect, the first possible implementation manner of the third aspect, or the second possible implementation manner of the third aspect, in a third possible implementation manner of the third aspect, the detection result indicates a result of identifying the Uscell; or the detection result indicates a measurement result of the reference signal corresponding to the Uscell; or the detection result indicates whether a distance difference from the Uscell satisfies a preset value.

With reference to the third aspect, the first possible implementation manner of the third aspect, the second possible implementation manner of the third aspect, or the third possible implementation manner of the third aspect, in a fourth possible implementation manner of the third aspect, when the detection indication information is the reference signal measurement reporting information, and when the detection result includes a channel quality indicator (CQI) of the Uscell, the detection result indicates an identifier of the Uscell or a pilot to which the CQI belongs and a level of the CQI.

In the information obtaining method and apparatus based on a Uscell provided in the embodiments of the present invention, detection indication information is obtained, where the detection indication information is used to instruct to identify a Uscell and/or instruct to measure a reference signal corresponding to the Uscell, then, detection is performed according to the detection indication information, and a detection result is reported to a base station. In the prior art, UE cannot obtain Uscell information in time or can only obtain rough Uscell information, so that reference signal quality of the Uscell cannot be determined. However, in the embodiments of the present invention, on an unlicensed cell, precision of the obtained Uscell information is significantly improved, so as to resolve a problem that the base station cannot complete addition and deletion of the Uscell, thereby significantly alleviating a current situation that current mobile operators do not satisfy requirements of users on communications services.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 3-1 is a schematic composition diagram of an information obtaining apparatus based on a Uscell according to another embodiment of the present invention;

FIG. 3-2 is a schematic composition diagram of an information obtaining apparatus based on a Uscell according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
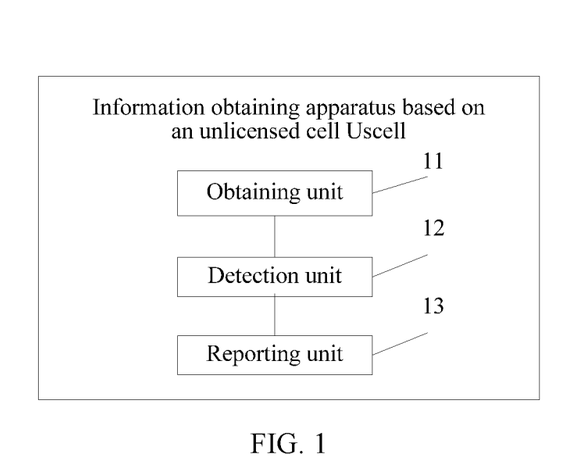
FIG. 1 is a schematic composition diagram of an information obtaining apparatus based on a Uscell according to an embodiment of the present invention.

An embodiment of the present invention provides an information obtaining apparatus based on a Uscell, and as shown in FIG. 1, the apparatus includes: an obtaining unit 11, a detection unit 12, and a reporting unit 13.

The obtaining unit 11 is configured to obtain detection indication information.

The detection indication information is used to instruct to identify a Uscell and/or used to instruct to measure a reference signal corresponding to the Uscell. The detection indication information is used to instruct to detect information about the Uscell, and the information about the Uscell includes a Uscell identifier or the reference signal corresponding to the Uscell.

The detection unit 12 is configured to detect the information about the Uscell by using the detection indication information obtained by the obtaining unit 11.

The reporting unit 13 is configured to report a detection result detected by the detection unit 12 to a base station.

Figure 2:
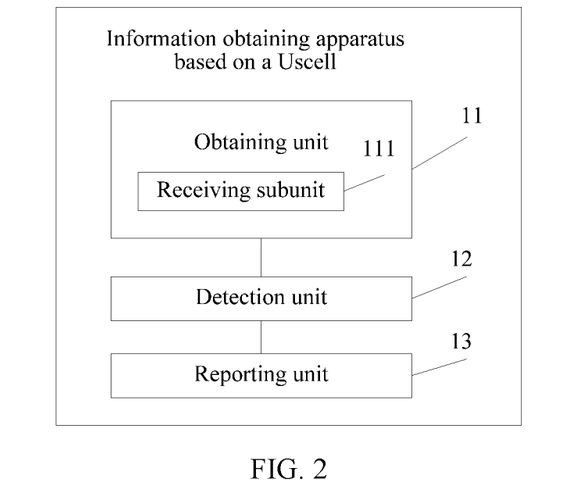
FIG. 2 is a schematic composition diagram of another information obtaining apparatus based on a Uscell according to an embodiment of the present invention.

In an optional composition manner of this apparatus, as shown in FIG. 2, the obtaining unit 11 includes a receiving subunit 111.

The receiving subunit 111 is configured to receive Uscell configuration information sent by the base station and use the Uscell configuration information as the detection indication information.

Alternatively, the receiving subunit 111 is configured to receive Uscell reference signal auxiliary information sent by the base station and use the Uscell reference signal auxiliary information as the detection indication information.

Alternatively, the receiving subunit 111 is configured to receive reference signal measurement reporting information sent by the base station and use the reference signal measurement reporting information as the detection indication information.

The reference signal measurement reporting information instructs user equipment UE to report content, such as a reporting cycle or a reporting form, of a reference signal corresponding to the Uscell.

It is worth noting that when the detection indication information obtained by the obtaining unit 11 is used to instruct to measure a reference signal corresponding to the Uscell, the reference signal corresponding to the Uscell includes at least one type of to-be-measured reference signal.

Further, the detection result reported by the reporting unit 13 indicates a result of identifying the Uscell; or the detection result indicates a measurement result of the reference signal corresponding to the Uscell; or the detection result indicates whether a distance difference from the Uscell satisfies a preset value.

It is worth noting that the detection result reported to the base station may also include any one or more of RSRP (reference signal received power) of the to-be-measured reference signal, whether the RSRP of the to-be-measured reference signal is greater than a predetermined threshold, or a CQI (channel quality indicator) index value. The CQI index value is used to indicate a level of channel quality. A high CQI index value indicates favorable channel quality. In addition, in such a reporting situation, the detection result reported to the base station indicates whether the UE is in proximity to a specific cell.

Furthermore, when the detection indication information is the reference signal measurement reporting information, and the detection result includes the CQI of the Uscell, the detection result indicates an identifier of the Uscell or a pilot to which the CQI belongs and a level of the CQI. That is, the detection result includes two parts of content, a part of the content indicates the identifier of the Uscell or the pilot to which the CQI belongs and the other part of the content indicates the level of the CQI.

It is worth noting that for explanations on a process of a method implemented by the apparatus shown in FIG. 1 or FIG. 2 in the embodiments of the present invention, refer to a process of a method described in FIG. 4 to FIG. 7 below or descriptions in examples corresponding to FIG. 4 to FIG. 7.

In a preferable composition implementation manner of the apparatus provided in this embodiment, the apparatus is UE.

In an information obtaining apparatus based on a Uscell provided in the embodiments of the present invention, first, an obtaining unit obtains detection indication information, the detection indication information is used to instruct to identify a Uscell and/or instruct to measure a reference signal corresponding to the Uscell, then, a detection unit performs detection according to the detection indication information, and a reporting unit reports a detection result to a base station. In the prior art, UE cannot obtain Uscell information in time or can only obtain rough Uscell information, so that reference signal quality of the Uscell cannot be determined. However, in the embodiments of the present invention, on an unlicensed cell, precision of the obtained Uscell information is significantly improved, so as to resolve a problem that the base station cannot complete addition and deletion of the Uscell, thereby significantly alleviating a current situation that current mobile operators do not satisfy requirements of users on communications services.

Figure 31:
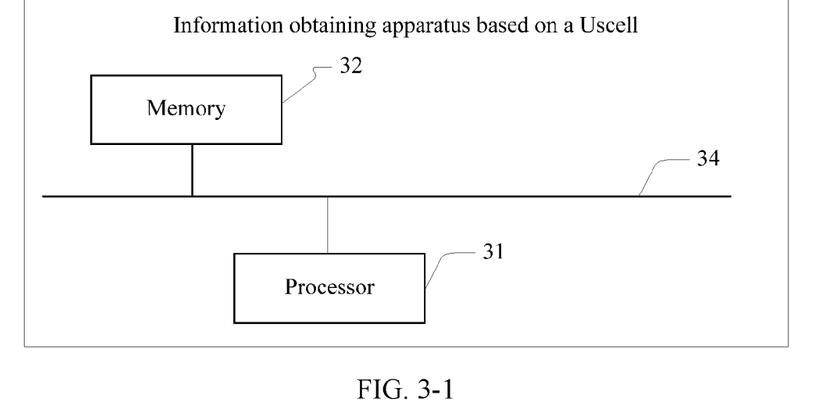
Figure 32:
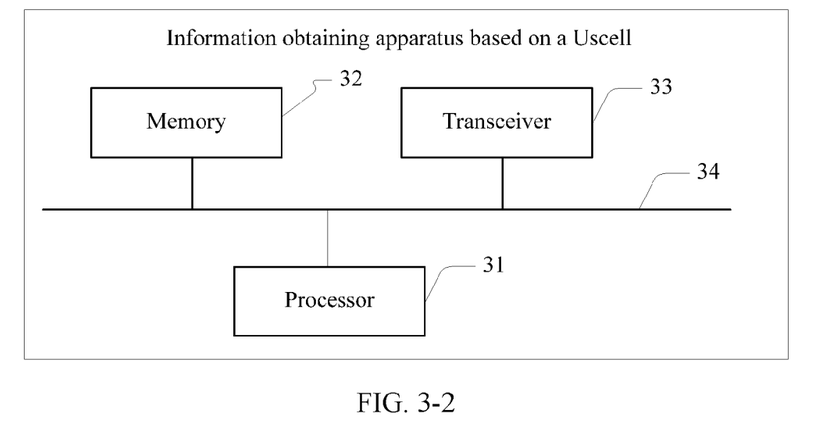

Another embodiment of the present invention provides an information obtaining apparatus based on a Uscell, and as shown in FIG. 3-1, the apparatus includes: a processor 31, a memory 32, and a bus 34. In an optional implementation manner of this embodiment, as shown in FIG. 3-2, the apparatus further includes a transceiver 33, where the memory 32, the transceiver 33, and the processor 31 are in communications connection by means of the bus 34.

A general-purpose central processing unit (CPU), a microprocessor, an application specific integrated circuit (ASIC), or one or more integrated circuits may be used as the processor 31, configured to execute a related program, thereby implementing a technical solution provided in an embodiment of the present invention.

The memory 32 may be a read only memory (ROM), a static storage device, a dynamic storage device, or a random access memory (RAM). The memory 32 may store an operating system and another application program. When a technical solution provided in an embodiment of the present invention is implemented by means software or firmware, program code used to implement the technical solution provided in the embodiment of the present invention is stored in the memory 32 and is executed by the processor 31.

The transceiver 33 is used for communication between the apparatus and another device or a communications network (for example, but not limited to, an Ethernet, a radio access network (RAN), or a wireless local area network (WLAN)).

The bus 34 may include a channel, to transmit information among components (for example, the processor 31, the memory 32, and the transceiver 33) of the apparatus.

It should be noted that although hardware shown in FIG. 3-2 such as the processor 31, the memory 32, the transceiver 33, and the bus 34 is merely shown, in a specific implementation process, a person skilled in the art shall understand that the apparatus further includes another device that is necessary for implementing normal running. Meanwhile, according to a specific requirement, a person skilled in the art shall understand that a hardware device for implementing another function may also be included.

It is worth noting that in this embodiment, the apparatus shown in FIG. 3-1 is configured to implement the apparatus shown in the embodiment of FIG. 1, and the apparatus shown in FIG. 3-2 is configured to implement the apparatus shown in the embodiment of FIG. 2.

The processor 31 is configured to obtain detection indication information, detect information about a Uscell by using the detection indication information and report a detection result to a base station.

The detection indication information is used to instruct to identify a Uscell, and/or used to instruct to measure a reference signal corresponding to the Uscell; and the detection indication information is used to instruct to detect the information about the Uscell, and the information about the Uscell includes a Uscell identifier or the reference signal corresponding to the Uscell.

The memory 32 is configured to store the detection indication information obtained by the processor 31 and the detection result.

With reference to the apparatus described in FIG. 3-2, in an optional implementation manner of this embodiment:

The transceiver 33 is configured to receive Uscell configuration information sent by the base station and send the Uscell configuration information received to the processor 31, where the processor 31 uses the Uscell configuration information as the detection indication information.

Alternatively, the transceiver 33 is configured to receive Uscell reference signal auxiliary information sent by the base station and send the Uscell reference signal auxiliary information received to the processor 31, where the processor 31 uses the Uscell reference signal auxiliary information as the detection indication information.

Alternatively, the transceiver 33 is configured to receive reference signal measurement reporting information sent by the base station and send the reference signal measurement reporting information received to the processor 31, where the processor 31 uses the reference signal measurement reporting information as the detection indication information.

The memory 32 is further configured to store the Uscell configuration information, the Uscell reference signal auxiliary information, or the reference signal measurement reporting information that is received by the transceiver 33.

It is worth noting that when the detection indication information is used to instruct to measure a reference signal corresponding to the Uscell, the reference signal corresponding to the Uscell includes at least one type of to-be-measured reference signal.

In addition, the detection result indicates a result of identifying the Uscell; or the detection result indicates a measurement result of the reference signal corresponding to the Uscell; or the detection result indicates whether a distance difference from the Uscell satisfies a preset value.

Further, when the detection indication information is reference signal measurement reporting information, and the detection result includes a CQI of the Uscell, the detection result indicates an identifier of the Uscell or a pilot to which the CQI belongs and a level of the CQI.

In the information obtaining apparatus based on a Uscell provided in the embodiments of the present invention, a processor obtains detection indication information, where the detection indication information is used to instruct to identify a Uscell and/or instruct to measure a reference signal corresponding to the Uscell, then, performs detection according to the detection indication information, and reports a detection result to a base station. In the prior art, UE cannot obtain Uscell information in time or can only obtain rough Uscell information, so that reference signal quality of the Uscell cannot be determined. However, in the embodiments of the present invention, on an unlicensed cell, precision of the obtained Uscell information is significantly improved, so as to resolve a problem that the base station cannot complete addition and deletion of the Uscell, thereby significantly alleviating a current situation that current mobile operators do not satisfy requirements of users on communications services.

Figure 4:
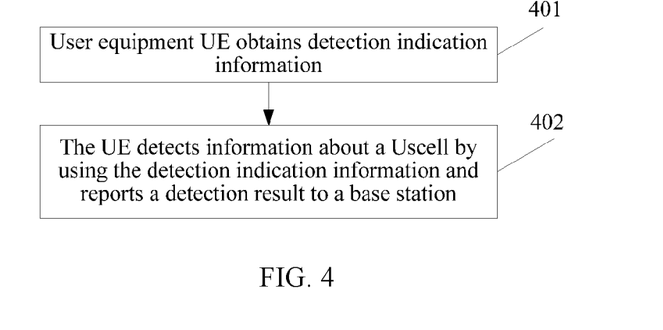
FIG. 4 is a flowchart of an information obtaining method based on a Uscell according to another embodiment of the present invention.

Another embodiment of the present invention provides an information obtaining method based on a Uscell, and as shown in FIG. 4, the method includes:

Step 401: UE obtains detection indication information.

The detection indication information is used to instruct to identify a Uscell, and/or the detection indication information is used to instruct to measure a reference signal corresponding to the Uscell; and the detection indication information is used to instruct to detect information about the Uscell, where the information about the Uscell includes a Uscell identifier or the reference signal corresponding to the Uscell.

It is worth noting that in this embodiment, the obtained detection indication information includes Uscell configuration information, Uscell reference signal auxiliary information, or the like that is received and that is sent from a base station.

Step 402: The UE detects information about a Uscell by using the detection indication information and reports a detection result to a base station.

It is worth noting that in the information obtaining method based on a Uscell provided in this embodiment, the UE detects the Uscell by using the detection indication information. Such an implementation process can be used to identify the Uscell or measure a reference signal of the identified Uscell.

In the information obtaining method based on a Uscell provided in the embodiments of the present invention, first, detection indication information needs to be obtained, where the detection indication information is used to instruct to identify a Uscell and/or instruct to measure a reference signal corresponding to the Uscell, then, detection is performed according to the detection indication information, and a detection result is reported to a base station. In the prior art, UE cannot obtain Uscell information in time or can only obtain rough Uscell information, so that reference signal quality of the Uscell cannot be determined. However, in the embodiments of the present invention, on an unlicensed cell, precision of the obtained Uscell information is significantly improved, so as to resolve a problem that the base station cannot complete addition and deletion of the Uscell, thereby significantly alleviating a current situation that current mobile operators do not satisfy requirements of users on communications services.

With reference to the description in step 401 of the foregoing embodiment, in the implementation manner provided in this embodiment, how to obtain detection indication information is described in detail, and specific manners of obtaining the detection indication information include the following three manners:

A first manner: UE receives Uscell configuration information sent by a base station and uses the Uscell configuration information as detection indication information.

A second manner: UE receives Uscell reference signal auxiliary information sent by a base station and uses the Uscell reference signal auxiliary information as detection indication information.

A third manner: UE receives reference signal measurement reporting information sent by a base station and uses the reference signal measurement reporting information as detection indication information.

The reference signal measurement reporting information instructs the UE to report content, such as a reporting cycle or a reporting form, of a reference signal corresponding to the Uscell.

It is worth noting that the foregoing first manner is used to trigger identification on the Uscell, the second manner is used to measure the reference signal of the Uscell, and the third manner is used in a case in which the detection indication information is used to detect a reference signal resource corresponding to the Uscell and report the reference signal resource in a reporting form specified in the reference signal measurement reporting information to the base station.

In an optional implementation manner of this embodiment, when the detection indication information is used to instruct to measure a reference signal corresponding to the Uscell, correspondingly, the reference signal corresponding to the Uscell includes at least one type of to-be-measured reference signal. Such an implementation manner is described in detail below in an embodiment shown in FIG. 7.

Further, after detecting the to-be-measured reference signal according to the detection indication information, the UE reports a detection result to the base station. The detection result indicates a result of identifying the Uscell. Alternatively, the detection result indicates a measurement result of the reference signal corresponding to the Uscell. Alternatively, the detection result indicates whether a distance difference from the Uscell satisfies a preset value.

The preset value indicates whether the UE is in proximity to the Uscell, and the preset value is set by a system. In this embodiment, when a distance difference between the UE and the Uscell is less than or equal to the preset value, it indicates that the Uscell can provide a communications service for the UE.

It is worth noting that detection indication information and detection results may not be in a one-to-one relationship and may be in a one-to-many combination manner. A detection result of a form of obtained detection indication information of any type may include any one or more of the detection result indicating a result of identifying the Uscell, or the detection result indicating a measurement result of the reference signal corresponding to the Uscell, or the detection result indicating whether a distance difference from the Uscell satisfies a preset value. For example, when the detection indication information is reference signal measurement reporting information, the detection result may indicate whether a distance difference between the UE and the Uscell satisfies a preset value and/or a measurement result of the reference signal corresponding to the Uscell.

In addition, when the detection indication information is reference signal measurement reporting information, and the detection result includes a CQI of the Uscell, the detection result indicates an identifier of the Uscell or a pilot to which the CQI belongs and a level of the CQI. Moreover, a specific reporting form of the CQI is described in detail below in the embodiment shown in FIG. 7 and an implementation manner corresponding to the embodiment.

Figure 5:
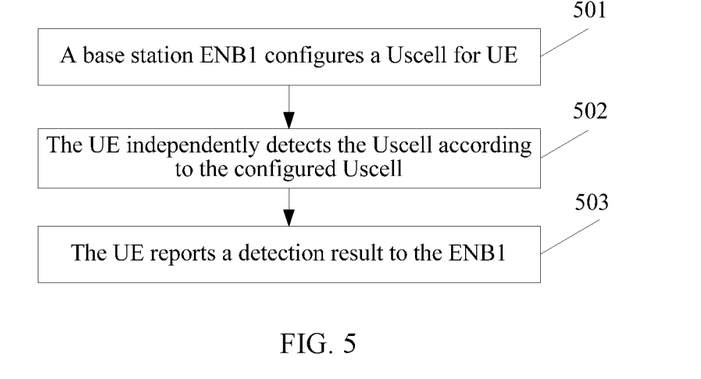
FIG. 5 is a flowchart of an information obtaining method based on a Uscell according to another embodiment of the present invention.

Another embodiment of the present invention provides an information obtaining method based on a Uscell. In this embodiment, Uscells belong to different base stations ENBs, for example, a Uscell 1 belongs to an ENB1, and a Uscell 2 belongs to an ENB2, and there is no ideal backhaul between the ENB1 and the ENB2. In this case, because different Uscells belong to different ENBs, the different ENBs may send possible reference signals at different times according to situations of resources that are competed for, and a time delay exists in a coordination process between base stations, UE belonging to the ENB1 cannot accurately know a time at which the ENB2 sends a reference signal. The reference signals may be SSs (synchronization signal), CRSs (cell reference signal), CSI-RSs (channel state indication reference signal), DMRSs (demodulation reference signal), or the like.

Specifically, as shown in FIG. 5, in this embodiment, UE belonging to an ENB1 is used as an example, and this method includes:

501: The ENB1 configures a Uscell for the UE.

Optionally, the ENB1 configures a Uscell for the UE by using an RRC (Radio Resource Control) message, for example, configures a frequency at which the Uscell is.

502: The UE independently detects the Uscell according to the configured Uscell.

Specifically, the independently detecting, by the UE, the Uscell includes, but not limited to, the following two detection forms:

A first detection form: After the ENB1 configures a Uscell for the UE, the UE immediately detects the Uscell.

A second detection form: After the ENB1 configures a Uscell for the UE, the UE does not trigger detection immediately, and until the ENB1 sends a detection instruction to the UE, the UE detects the Uscell according to the detection instruction.

Optionally, a blind detection manner may be used as a manner in which the UE detects the Uscell, so that the UE identifies, by means of blind detection, a cell that satisfies a configuration of the Uscell.

503: The UE reports a detection result to the ENB1.

Specifically, in the embodiments of the present invention, the detection result includes that the UE identifies a Uscell and meanwhile, reports which Uscell or Uscells are identified; or the detection result is that the UE identifies no Uscell.

When no Uscell is identified, execution of the solution is stopped, or the detection is continued, or when a preset detection time or a preset number of detection times is reached, the detection is stopped, which is not limited in the embodiments of the present invention. In this embodiment, an example in which the detection result indicates that the UE identifies a Uscell is used for description.

Specifically, the detection result reported by the UE may only indicate that the UE finds the Uscell or may also further indicate the UE finds a frequency or bandwidth of the Uscell or an identifier of the Uscell. Alternatively, according to an actual situation, the detection result may include a measurement result of a reference signal of the identified Uscell, or the detection result may include whether the UE is in proximity to the Uscell, that is, whether a distance difference between the UE and the Uscell satisfies a preset value, or the detection result may include a measurement result of a reference signal corresponding to the identified Uscell.

It is worth noting that the detection result may also include any one or more other messages, which is not limited in the embodiments of the present invention.

With reference to the method described in FIG. 5 above, in an implementation manner of this embodiment, with reference to the description in 501, it is also possible that the ENB1 sends Uscell reference signal auxiliary information to the UE.

The Uscell reference signal auxiliary information includes, but not limited to, a time segment or a pattern in which the ENB2 sends a possible reference signal of the Uscell.

Further, the UE measures the reference signal of the Uscell according to the Uscell reference signal auxiliary information.

In this implementation manner, the detection result reported by the UE to the ENB1 indicates at least a measurement result of the reference signal corresponding to the Uscell, and certainly, the detection result may also indicate a result of identification of the UE on the Uscell and a distance difference between the UE and the Uscell. Certainly, according to an actual situation, the detection result may also include any one or more other types of information, and specific content included in the detection result is not defined in this implementation manner.

It is worth noting that with reference to the content in the aforementioned Uscell reference signal auxiliary information, detection performed by the UE according to the Uscell reference signal auxiliary information mentioned herein, as compared with the blind detection, further clarifies a detection time, reduces complexity of detecting, by the UE, the Uscell, and improves detection efficiency.

The embodiments of the present invention do not define a specific manner in which the UE detects the Uscell.

Figure 6:
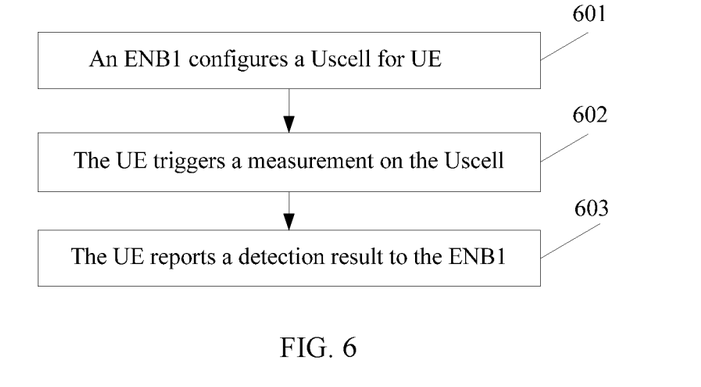
FIG. 6 is a flowchart of another information obtaining method based on a Uscell according to another embodiment of the present invention.

Another embodiment of the present invention provides an information obtaining method based on a Uscell, and in this embodiment, an application scenario is the same as that of the method described in the previous embodiment. As shown in FIG. 6, the method includes:

601: An ENB1 configures a Uscell for UE.

602: The UE triggers a measurement on the Uscell.

It is worth noting that in this embodiment, the UE may trigger a measurement on the Uscell without depending on the Uscell configured by the ENB1. That is, the foregoing steps 601 and 602 may be independent of each other.

In addition, it is worth noting that as compared with the configuring, by the ENB1, the Uscell for the UE in the previous embodiment, in this embodiment, if the foregoing step 601 is not performed, it indicates that the current ENB1 does not intend that the UE applies a Ucell resource or the ENB1 does not determine a location of the UE, that is, does not determine a Ucell that can be used by the UE. In this case, the UE may independently detect a situation of a surrounding Ucell and update a detection result in time, so as to report the detection result to the ENB1.

Both of the Uscell and the Ucell represent cells using unlicensed spectrums. However, the Uscell represents a cell that uses an unlicensed spectrum and that is configured by the ENB1 for the UE, and the Ucell represents a cell that uses an unlicensed spectrum and that is not configured by the ENB1 for the UE.

603: The UE reports a detection result to the ENB1.

Specifically, in this embodiment, whether the UE reports a detection result to the ENB1 includes, but not limited to, the following two situations:

A first situation: Whether the UE reports a detection result to the ENB1 depends on whether the ENB1 configures the Uscell for the UE, and this situation is divided into the following two forms:

A first form: When the UE finds the Uscell and that the ENB1 does not configure the Uscell for the UE, that the UE does not report the detection result indicates that the UE detects the Uscell.

A second form: Only when the ENB1 configures the Uscell for the UE, the UE reports the Uscell detected by the UE to the ENB1.

A second situation: The UE may also not depend on the Uscell configured by the ENB1, and after the UE detects the Uscell, the UE reports the detection result to the ENB1. This embodiment does not define a time at which the UE reports the detection result.

Figure 7:
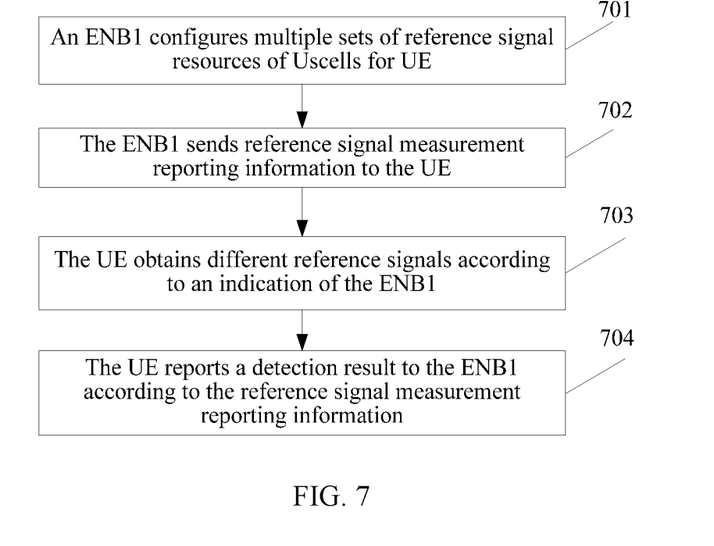
FIG. 7 is a flowchart of another information obtaining method based on a Uscell according to another embodiment of the present invention.

Another embodiment of the present invention provides an information obtaining method based on a Uscell, and in this embodiment, Uscells belong to a same ENB, or Uscells belong to different ENBs, but there is an ideal backhaul between the ENBs. Existence of the ideal backhaul between base stations indicates that the ENBs may synchronously obtain times at which different cells send reference signals. The reference signals may be SSs, CRSs, CSI-RSs, DMRSs, or the like. In this case, an ENB1 may configure different reference signal measurement and reporting resources for the UE to enable the UE to quickly find a Ucell in proximity and notify the ENB1.

In this embodiment, as shown in FIG. 7, the method includes:

701: The ENB1 configures multiple sets of reference signal resources of Uscells for the UE.

In this embodiment, to simplify description, the multiple sets of reference signal resources of the Uscells are described as multiple sets of measurement resources.

The multiple sets of measurement resources may be divided into the following three types:

A first type: The multiple sets of measurement resources may be any two or more of four types of measurement resources: a CRS, a CSI-RS, an SS, or a DMRS.

A second type: The multiple sets of measurement resources are any one of four types of measurement resources and the measurement resource includes at least two classifications.

Specifically, because any one of the four types of measurement resources may be further specifically divided, for example, the CRS may include a CRS1, a CRS2, a CRS3, and the like, which is merely an example of specific division of a type of resource, and the CRS1, the CRS2, and the CRS3 merely divide different types of the CRS, and merely play a role of identification, but do not represent names of CRSs after specific subdivision. The embodiments of the present invention do not define each classification of measurement resources or a representation form of the each classification.

A third type: The multiple sets of measurement resources are any one or more of the four types of measurement resources or any one or more classifications of any type of measurement resources.

It is worth noting that according to an actual situation, the measurement resources may further be any one or more other types of reference signals, which is not defined in the embodiments of the present invention.

702: The ENB1 sends reference signal measurement reporting information to the UE.

The reference signal measurement reporting information instructs the UE to report content, such as a reporting cycle or a reporting form, of the reference signal.

It is worth noting that in this embodiment, an execution sequence of steps 701 and 702 is not limited to the foregoing consecutive sequence relationship.

703: The UE obtains different reference signals according to an indication of the ENB1.

It is worth noting that the indication of the ENB1 includes, but not limited to, the following two indication situations:

A first indication situation: The ENB1 instructs the UE to obtain a reference signal by using a PDCCH (physical downlink control channel) or an EPDCCH (enhanced physical downlink control channel).

In the first indication situation: the ENB1 may directly indicate a location of a time frequency resource of a reference signal to the UE. In this case, content information in the PDCCH or EPDCCH includes information about a location for obtaining, by the UE, a reference signal, so that the UE may obtain the reference signal without need of multiple sets of measurement resources configured by the ENB1 for the UE.

A second indication situation: The UE obtains a reference signal according to the multiple sets of measurement resources configured by the ENB1 for the UE.

704: The UE reports a detection result to the ENB1 according to the reference signal measurement reporting information.

The detection result includes different measured values.

The measured values reported specifically include the following three forms:

A first form: The measured value reported may be RSRP or RSRQ (reference signal received quality) based on the reference signal.

A second form: Whether the RSRP or RSRQ of the reference signal is greater than a specific threshold is reported.

Specifically, the specific threshold is set by the ENB1 or a system. For example, when the RSRP or RSRQ is greater than a specific threshold, the value reported is 1, or when the RSRP or RSRQ is less than the threshold, the value reported is 0.

A third form: A CQI index value is reported to directly indicate a status level of a channel.

The CQI index value is used to indicate a level of channel quality. A high CQI index value indicates favorable channel quality.

It is worth noting that according to an actual situation, a form of the measured value reported in the embodiments of the present invention may further include any one or more other types of information, which is not limited in the embodiments of the present invention.

In the information obtaining method based on a Uscell provided in the embodiments of the present invention, the ENB1 configures multiple sets of measurement resources for the UE, and then, the UE obtains different reference signals according to the indication of the ENB1. Furthermore, the UE reports a measured value. In this embodiment, the UE obtains different reference signals. In this way, the UE can perform multiple selections on a time for obtaining the reference signal and a location for obtaining the reference signal. Therefore, the UE can obtain the reference signal more accurately.

Further, in another implementation manner of this embodiment, the ENB1 may configure or indicate multiple pilots or cells for the UE and instruct the UE to measure the reference signal, for example, instruct the UE to measure a CSI-RS.

Further, in another implementation manner of this embodiment, the detection result reported by the UE can indicate whether the UE is in proximity to the cell or whether the CQI of the cell is out of range, where the cell refers to a Uscell.

It is worth noting that the UE can use a few cells at a same moment, so that the ENB1 can share a resource reported by the UE (for example, ten pilot frequency identifiers that identify measurable locations of a pilot frequency are configured for the UE), and then the UE reports, to the ENB1 by sharing the resource reported by the UE, a pilot identifier that can be measured, or reports a pilot identifier indicating that the CQI corresponding to the pilot is not out of range, or reports M most favorable pilot identifiers, where M is a positive integer less than 10.

In a specific implementation manner of this embodiment, when the detection result is the CQI of the Uscell, the detection result includes two parts of content, which respectively indicate an identifier of the Uscell or the pilot to which the CQI belongs and a level of the CQI.

It is worth noting that because in the implementation manner provided in this embodiment, in the detection result, a Uscell having favorable signal quality is reported, and a part of the content of the reported result records the identifier of the Uscell or the pilot to which the CQI belongs, it indicates that the UE is in proximity to the Uscell or pilot corresponding to the identifier. Moreover, the other part of the content of the reported result records the level of the CQI, so that whether the CQI is out of range can be indicated by using the level of the CQI.

In a specific reporting process to the ENB1, for example, reported 5 bits of the CQI may be multiplexed. In this detection result, the 5 bits of the CQI are divided in this way: The first 4 bits indicate the identifier of the pilot or the Uscell to which the CQI belongs, and the last bit indicates whether the measured CQI is out of range.

In such a reporting form, which is distinguished from that in the prior art, all of the 5 bits are used to report the level of the CQI, and the level is one of 32 CQI levels, In a reporting process from the UE to the ENB1, only the level of the CQI thereof is reported, and the ENB1 cannot clearly learn which pilot or Uscell the CQI belongs to. In addition, in this embodiment, the ENB1 does not need to obtain an accurate level of the CQI corresponding to each Uscell or pilot. In this way, if an existing CQI reporting form is used, system resources are wasted. Therefore, in this embodiment, a new reporting form is proposed to significantly reduce waste of system resources.

It is worth noting that the foregoing merely describes a CQI reporting form, and in an actual application process, the embodiments of the present invention do not define the specific reporting form. For example, it is also possible that the first 3 bits of the 5 bits indicate which pilot or Uscell the CQI belongs to, and the last 2 bits indicate whether the measured CQI corresponding to the pilot is out of range. Alternatively, a total quantity of bits is not limited to 5.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information obtaining apparatus based on an unlicensed cell (Uscell), wherein the apparatus comprises:
   a processor configured to obtain detection indication information, wherein:
   the detection indication information instructs at least one of identifying a Uscell or measuring a reference signal corresponding to the Uscell; and the detection indication instructs detecting information about the Uscell, wherein the information about the Uscell comprises a Uscell identifier or the reference signal corresponding to the Uscell;
   the processor, further configured to detect the information about the Uscell by using the detection indication information; and
   a sender, configured to report a detection result detected by the processor to a base station,
   wherein the detection result indicates whether a distance from the Uscell satisfies a preset value.

2. The apparatus according to claim 1, wherein the apparatus comprises:
   a receiver configured to receive Uscell configuration information sent by the base station, wherein the Uscell configuration information is used as the detection indication information; or
   the receiver configured to receive Uscell reference signal auxiliary information sent by the base station, wherein the Uscell reference signal auxiliary information is used as the detection indication information; or
   the receiver configured to receive reference signal measurement reporting information sent by the base station, wherein the reference signal measurement reporting information is used as the detection indication information.

3. The apparatus according to claim 2, wherein when the detection indication information obtained by the processor instructs measuring the reference signal corresponding to the Uscell, the reference signal corresponding to the Uscell comprises at least one type of to-be-measured reference signal.

4. An information obtaining apparatus based on an unlicensed cell (Uscell), wherein the apparatus comprises:
   a processor configured to obtain detection indication information, detect information about a Uscell by using the detection indication information, and report a detection result to a base station, wherein
   the detection indication information instructs at least one of identifying a Uscell or measuring a reference signal corresponding to the Uscell; and the detection indication information instructs detecting the information about the Uscell, wherein the information about the Uscell comprises a Uscell identifier or the reference signal corresponding to the Uscell; and
   a memory configured to store the detection indication information obtained by the processor and the detection result, wherein the detection result indicates whether a distance from the Uscell satisfies a preset value.

5. The apparatus according to claim 4, wherein the apparatus further comprises:
a transceiver configured to receive Uscell configuration information sent by the base station and send the Uscell configuration information received to the processor, wherein the processor uses the Uscell configuration information as the detection indication information; or
the transceiver configured to receive Uscell reference signal auxiliary information sent by the base station and send the Uscell reference signal auxiliary information received to the processor, wherein the processor uses the Uscell reference signal auxiliary information as the detection indication information; or
the transceiver configured to receive reference signal measurement reporting information sent by the base station and send the reference signal measurement reporting information received to the processor, wherein the processor uses the reference signal measurement reporting information as the detection indication information, wherein
the memory is further configured to store the Uscell configuration information, the Uscell reference signal auxiliary information, or the reference signal measurement reporting information that is received by the transceiver.

6. The apparatus according to claim 5, wherein when the detection indication information instructs measuring a reference signal corresponding to the Uscell, the reference signal corresponding to the Uscell comprises at least one type of to-be-measured reference signal.

7. An information obtaining method based on an unlicensed cell (Uscell), wherein the method comprises:
obtaining detection indication information, wherein the detection indication information instructs at least one of identifying a Uscell or measuring a reference signal corresponding to the Uscell; and the detection indication information instructs detecting information about the Uscell, wherein the information about the Uscell comprises a Uscell identifier or the reference signal corresponding to the Uscell; and
detecting the information about the Uscell by using the detection indication information and reporting a detection result to a base station,
wherein the detection result indicates whether a distance difference from the Uscell satisfies a preset value.

8. The method according to claim 7, wherein the obtaining detection indication information comprises:
receiving Uscell configuration information sent by the base station and using the Uscell configuration information as the detection indication information; or
receiving Uscell reference signal auxiliary information sent by the base station and using the Uscell reference signal auxiliary information as the detection indication information; or
receiving reference signal measurement reporting information sent by the base station and using the reference signal measurement reporting information as the detection indication information.

9. The method according to claim 8, wherein when the detection indication information instructs measuring a reference signal corresponding to the Uscell, the reference signal corresponding to the Uscell comprises at least one type of to-be-measured reference signal.

* * * * *